(12) United States Patent
Chen (10) Patent No.: US 10,694,842 B2
(45) Date of Patent: Jun. 30, 2020

(54) AUTOMATIC ELEVATION-ADJUSTING SYSTEM

(71) Applicant: TCT Nanotec Co., Ltd., Taichung (TW)

(72) Inventor: Yi-I Chen, Taichung (TW)

(73) Assignee: TCT Nanotec Co., Ltd., Taichung (TW)

(*) Notice: Subject to any disclaimer, the term of this patent is extended or adjusted under 35 U.S.C. 154(b) by 272 days.

(21) Appl. No.: 15/893,791

(22) Filed: Feb. 12, 2018

(65) Prior Publication Data

US 2019/0246789 A1   Aug. 15, 2019

(51) Int. Cl.
*G05B 15/02* (2006.01)
*A47B 9/20* (2006.01)
*A47B 21/02* (2006.01)
*A47B 19/06* (2006.01)
*A47B 17/02* (2006.01)

(52) U.S. Cl.
CPC ............... *A47B 21/02* (2013.01); *A47B 9/20* (2013.01); *G05B 15/02* (2013.01); *A47B 17/02* (2013.01); *A47B 19/06* (2013.01); *A47B 2200/0054* (2013.01); *A47B 2200/0062* (2013.01)

(58) Field of Classification Search
None
See application file for complete search history.

(56) References Cited

U.S. PATENT DOCUMENTS

| | | | | |
|---|---|---|---|---|
| 6,964,370 B1* | 11/2005 | Hagale | ............... | A47C 31/008 235/380 |
| 2011/0082014 A1* | 4/2011 | Leonhard | ............... | A47B 83/02 482/57 |
| 2014/0096706 A1* | 4/2014 | Labrosse | ............... | A47B 21/02 108/21 |
| 2014/0208986 A1* | 7/2014 | DesRoches | ............ | G05B 15/02 108/22 |
| 2017/0052517 A1* | 2/2017 | Tsai | ............... | A47B 9/00 |
| 2017/0135587 A1* | 5/2017 | DesRoches | ............ | A47B 21/04 |
| 2017/0318958 A1* | 11/2017 | Asante | ............... | A47B 19/06 |
| 2017/0354244 A1* | 12/2017 | Lee | ............... | A47B 9/20 |
| 2018/0184800 A1* | 7/2018 | Yamamoto | ............ | A47B 9/20 |

* cited by examiner

*Primary Examiner* — Thomas C Lee
*Assistant Examiner* — Gary Collins
(74) *Attorney, Agent, or Firm* — Alan D. Kamrath; Karin L. Williams; Mayer & Williams PC (57) ABSTRACT

An automatic elevation-adjusting system includes an elevating unit, a control panel, a setting module, a calculating module and a central control module. The control panel includes a power icon, a direction icon unit, a setting icon, and a mode icon unit. The setting icon is operable to actuate the setting module to allow a user to press the direction icon unit and the power icon to enter data including a name, height, sex and age. The calculating module calculates average elevations for playing games, writing, reading and standing based on the user's sex and age, a pre-set specification of the table and an average height corresponding to the user's sex and age. The central control module actuates the elevating unit to move a table to the average elevation for playing games, writing, reading or standing when the game, writing, reading or standing icon of the mode icon unit is pressed.

6 Claims, 9 Drawing Sheets

AUTOMATIC ELEVATION-ADJUSTING SYSTEM

BACKGROUND OF INVENTION

1. Field of Invention

The present invention relates to a table and, more particularly, to an apparatus for automatically adjusting the elevation of a table based on the age and sex of a user.

2. Related Prior Art

The elevation of a table can be automatically or manually adjusted according to a user's discretion. The user's discretion is based on habits, self-feeling, and measurement of the elevation of the table by bare eyes. The user's discretion is hence not precise. The adjustment based on the user's discretion is not precise, and will very likely cause damages to a child or teenager's eyes, bones and/or muscles if he or she uses the table to read, write and/or operate a computer often and for long hours.

The present invention is therefore intended to obviate or at least alleviate the problems encountered in prior art.

SUMMARY OF INVENTION

It is the primary objective of the present invention to provide a table with a precise automatic table-elevating system.

To achieve the primary objective, the automatic table-elevating system includes an elevating unit, a control panel, a setting module, a calculating module and a central control module. The elevating unit is adapted for moving a board of the table. The control panel is attached to the board and includes a display and an icon region. The icon region includes a power icon, a direction icon unit, a setting icon and a mode icon unit. The direction icon unit includes an upward icon and a downward icon. The mode icon unit includes a game icon, a writing icon, a reading icon and a standing icon. The setting icon is operable to actuate the setting module to execute a name-setting program, a height-setting program, a sex-setting program and an age-setting program to allow a user to press the direction icon unit and the power icon to enter data that includes a name, height, sex and age, and then build a user database to store the data. The calculating module is operable to actuate an elevation-calculating program to calculate an average elevation for playing games, an average elevation for writing, an average elevation for reading and an average elevation for standing based on the user's sex and age, a specification of the table and an average height corresponding to the user's sex and age, and then store the average elevations in the user database. The central control module controls the elevating unit, the control panel, the setting module, the user database and the calculating module. The central control module actuates the elevating unit to move the board to the average elevation for playing games when the game icon is pressed. The central control module actuates the elevating unit to move the board to the average elevation for writing when the writing icon is pressed. The central control module actuates the elevating unit to move the board to the average elevation for reading when the reading icon is pressed. The central control module actuates the elevating unit to move the board to the average elevation for standing when the standing icon is pressed.

The setting module may further include a race-setting program operable to allow the user to press the direction icon unit and the power icon to enter the user's race into the user database. The calculating module calculates the average elevations based on the user's race as well as the user's sex and age.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
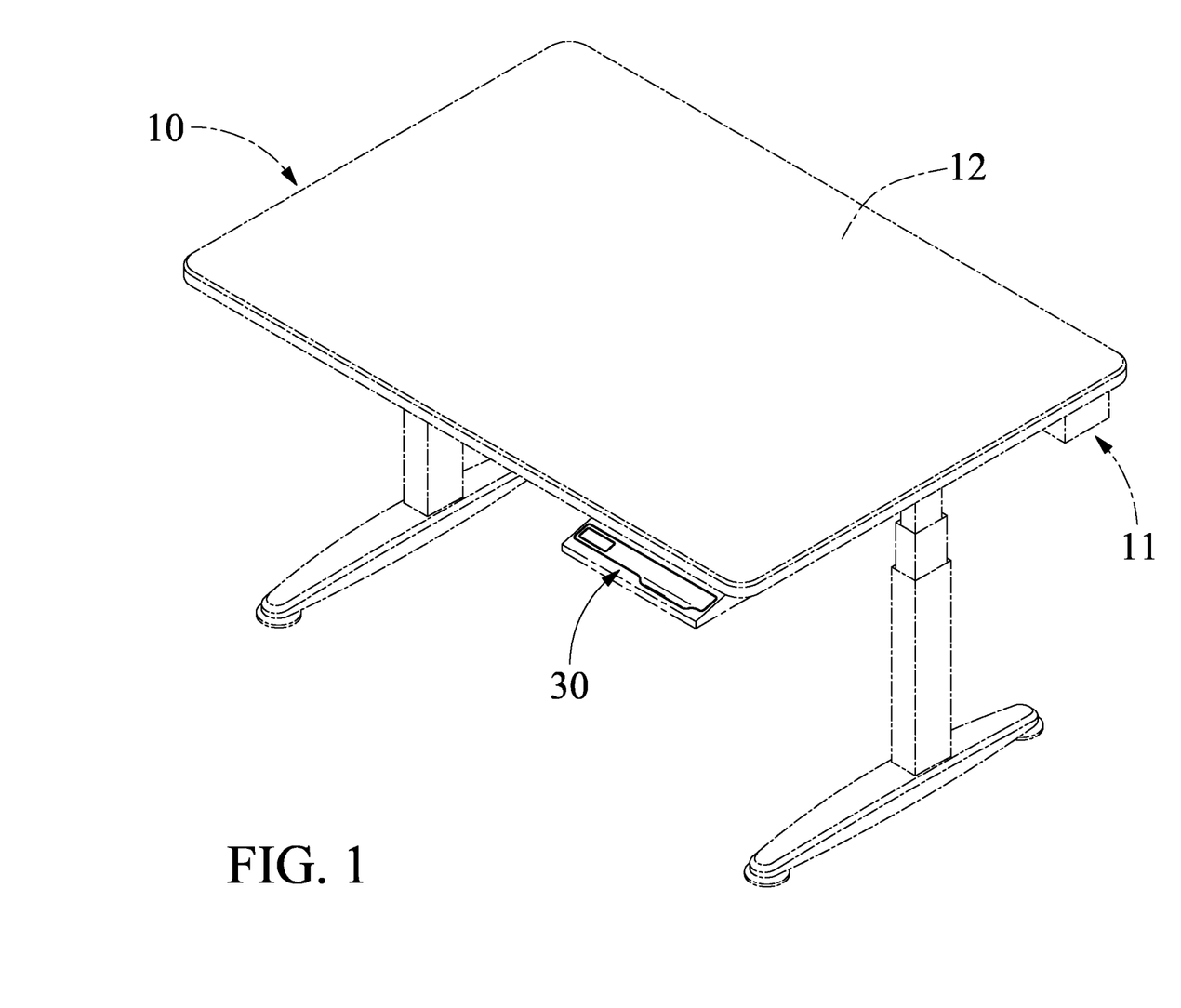
FIG. 1 is a perspective view of a table equipped with an automatic elevation-adjusting system according to the preferred embodiment of the present invention.
Figure 2:
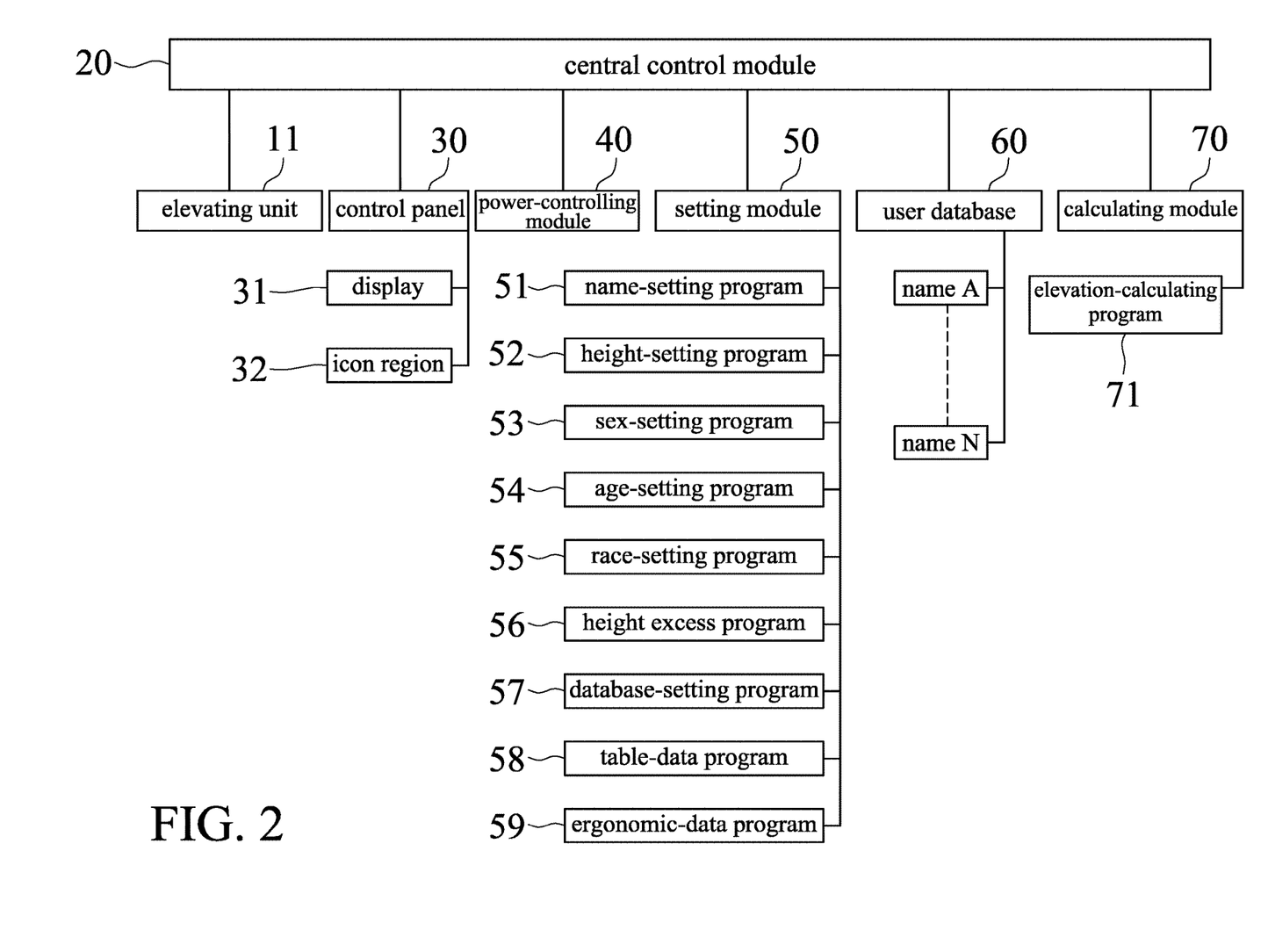
FIG. 2 is a block diagram of the automatic elevation-adjusting system shown in FIG. 1.
Figure 3:
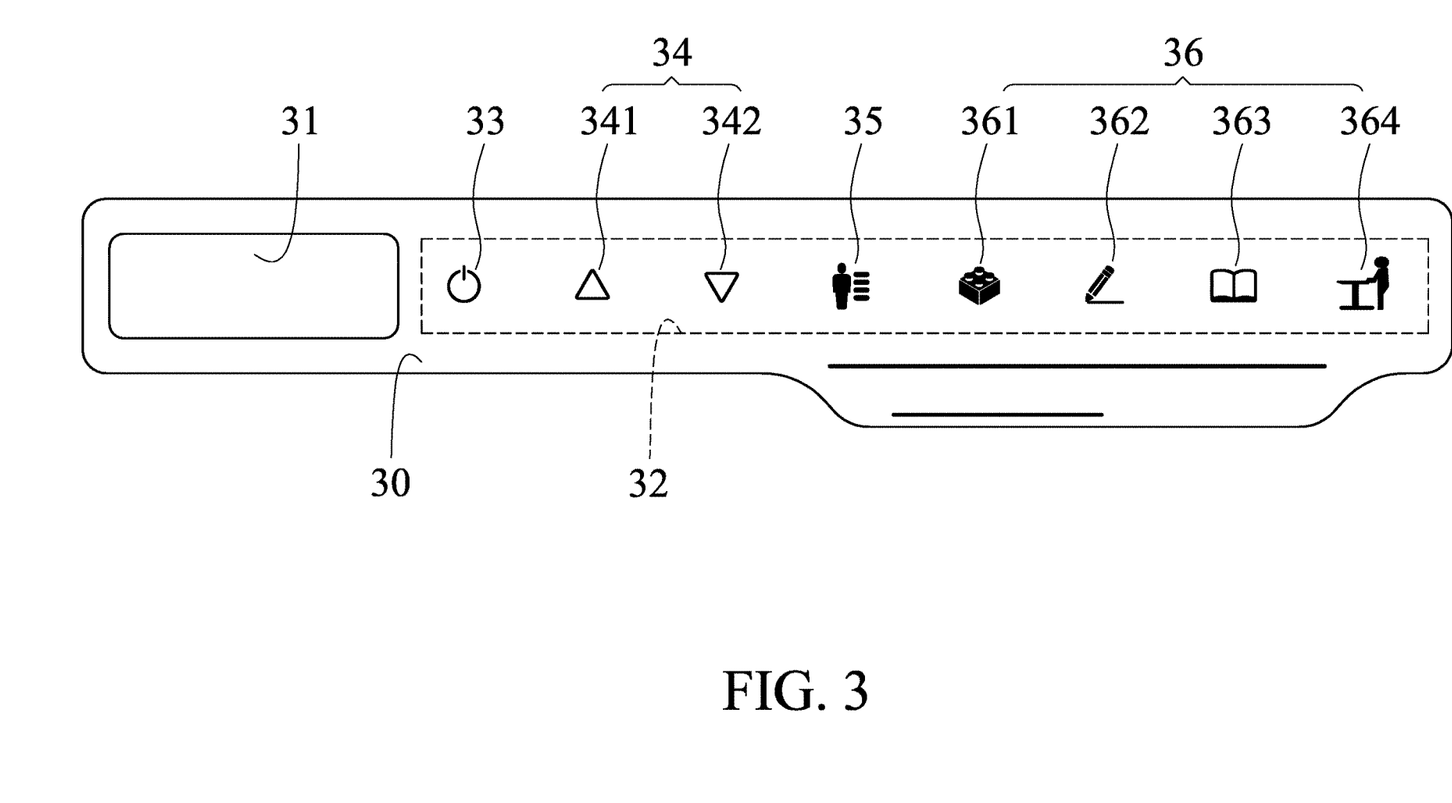
FIG. 3 is a front view of a control panel of the automatic elevation-adjusting system shown in FIG. 1.

Referring to FIGS. 1 through 3, a table 10 is equipped with an automatic elevation-adjusting system according to the preferred embodiment of the present invention. The table 10 includes a board 12 supported on two telescopic struts (not numbered).

The automatic elevation-adjusting system includes an elevating unit 11, a central control module 20, a control panel 30, a power-controlling module 40, a setting module 50, a user database 60 and a calculating module 70. The elevating unit 11 is used to extend or shrink the telescopic struts to lift or lower the board 12. To this end, the elevating unit 11 includes a motor (not shown) and a mechanism (not shown) for connecting the motor to the telescopic struts. However, such motor or mechanism will not be described in detail for not being the spirit of the present invention.

The central control module 20 is used to instruct, control, command and manage the elevating unit 11, the control panel 30, the power-controlling module 40, the setting module 50, the user database 60 and the calculating module 70.

The control panel 30 is attached to an edge of the board 12. The control panel 30 includes a display 31 and an icon region 32. The display 31 is used to show data about the automatic elevation-adjusting system. The data includes but not limited to numbers and units of measurement of the elevation of the board 12, users' names, sexes, ages and races. The icon region 32 includes a power icon 33, a direction icon unit 34, a setting icon 35 and a mode icon unit 36. The power icon 33 can be pressed for a properly long period of time to turn off the automatic elevation-adjusting system or just touched the power icon 33 to turn the automatic elevation-adjusting system into an ON state from a standby state. Alternatively, the power icon 33 can be used for confirmation when a user's data is entered or selected. The direction icon unit 34 includes an upward icon 341 and a downward icon 342. The upward icon 341 is used to lift the board 12 while the downward icon 342 is operable to lower the board 12. Alternatively, the upward icon 341 and the downward icon 342 are used to change the data shown on the display 31. The setting icon 35 is operable to actuate the setting module 50. The mode icon unit 36 includes a game icon 361, a writing icon 362, a reading icon 363 and a standing icon 364. In use, the game icon 361, the writing icon 362, the reading icon 363 or the standing icon 364 is operated to adjust the elevation of the board 12 so that the elevation of the board 12 is for playing games, writing, reading or standing. The control panel 30 can be a touch panel that includes the display 31 and the icon region 32. However, the control panel 30 can include a conventional display instead of the display and conventional buttons instead of icon region 32.

Figure 4:
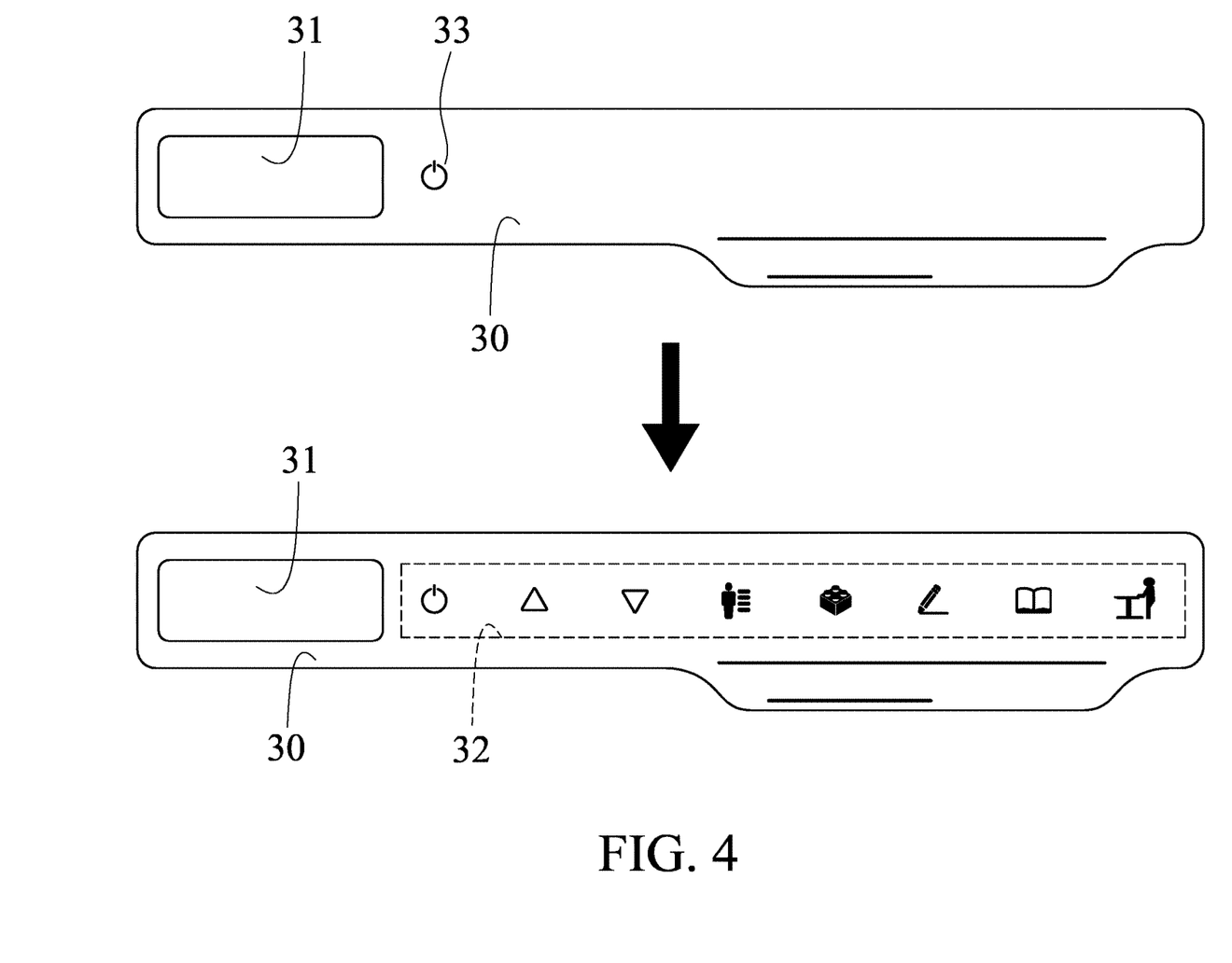
FIG. 4 is a front view of the control panel switched to the position shown in FIG. 3 from another position.

Referring to FIGS. 2 and 4, the power-controlling module 40 is used to receive an ON/OFF signal and accordingly turn on or off the automatic elevation-adjusting system. Where the control panel 30 is a touch panel and the automatic elevation-adjusting system is turned on, the power icon 33 of the control panel 30 is shown to indicate a standby state. When the power icon 33 is pressed, the central control module 20 receives an operation command, and executes a home page-displaying program to show the icon region 32 on the control panel 30. Where the icon region 32 of the control panel 30 includes conventional buttons, the information of the standby or in-operational state is shown in the display 31.

Figure 5:
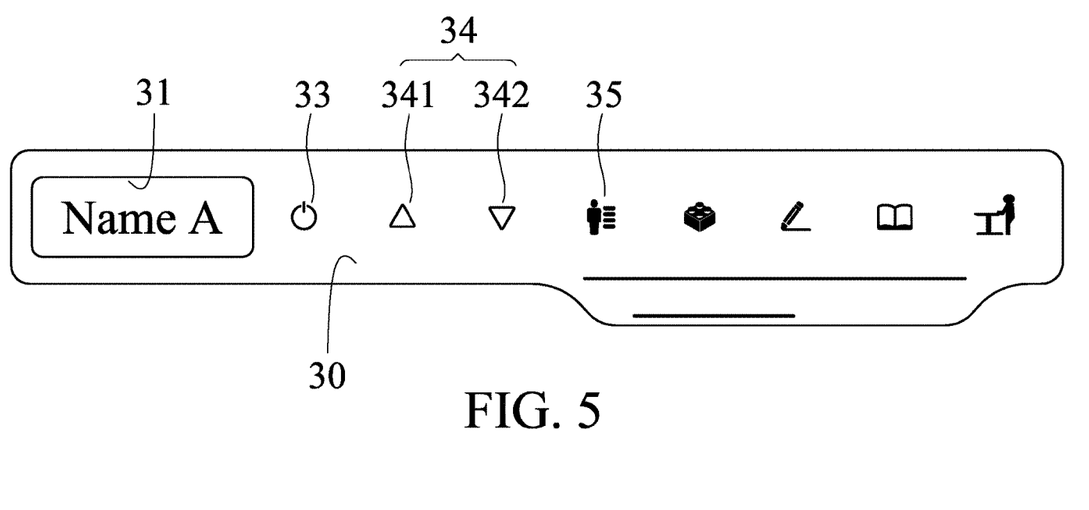
FIG. 5 is a front view of the control panel in another position than shown in FIG. 3.

Referring to FIGS. 2 and 5, when the setting icon 35 is pressed, the central control module 20 instructs the setting module 50 to execute a name-setting program 51 to receive a name entered by a user by pressing the upward icon 341, the downward icon 342 and the power icon 33. The entering or select of the user's name includes but not limited to that the name-setting program 51 shows letters on the display 31, and the user presses the upward icon 341 and/or the downward icon 342 to select letters, one after another and presses the power icon 33 for confirmation after completing the spelling of the user's name.

Figure 6:
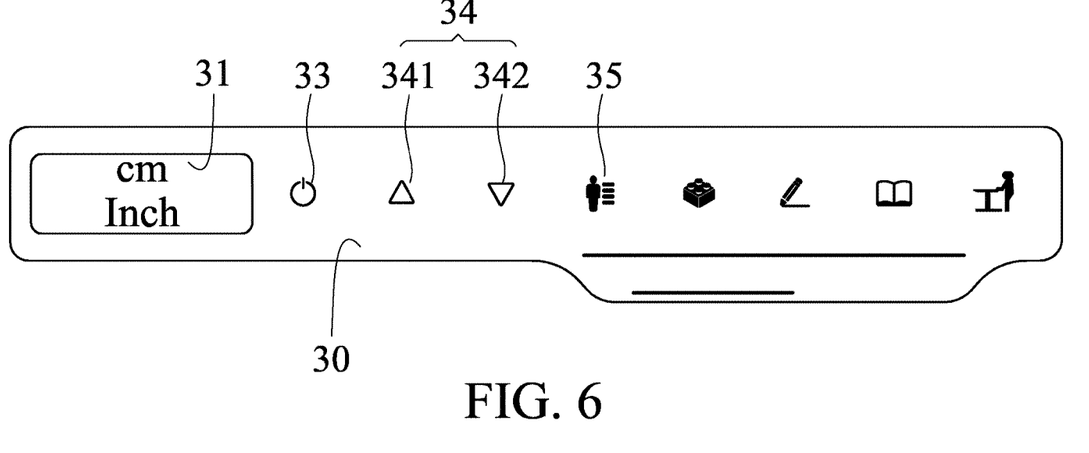
FIG. 6 is a front view of the control panel in another position than shown in FIG. 5.

Referring to FIGS. 2 and 6, the setting module 50 actuates a height-setting program 52 to show "cm" and "inch" on the display 31. The user can press the upward icon 341, the downward icon 342 and the power icon 33 to select a unit of measurement. Although not shown, the setting module 50 further actuates the height-setting program 52 to allow the user to enter a number representing his or her height measured by the selected unit of measurement.

Figure 7:
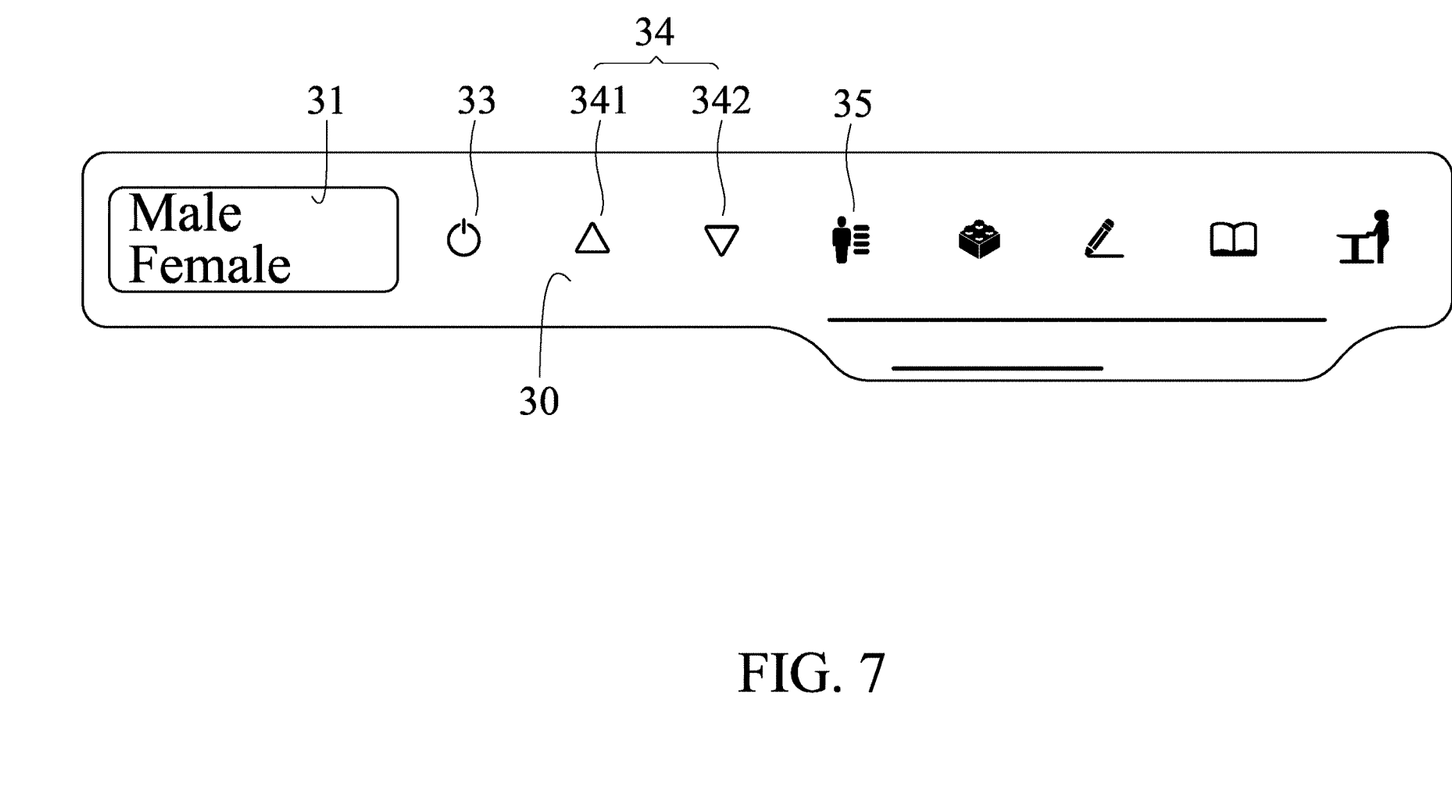
FIG. 7 is a front view of the control panel in another position than shown in FIG. 6.

Referring to FIGS. 2 and 7, the setting module 50 actuates a sex-setting program 53 to show "male" and "female" on the display 31. The user can press the upward icon 341, the downward icon 342 and the power icon 33 to select a sex.

Figure 8:
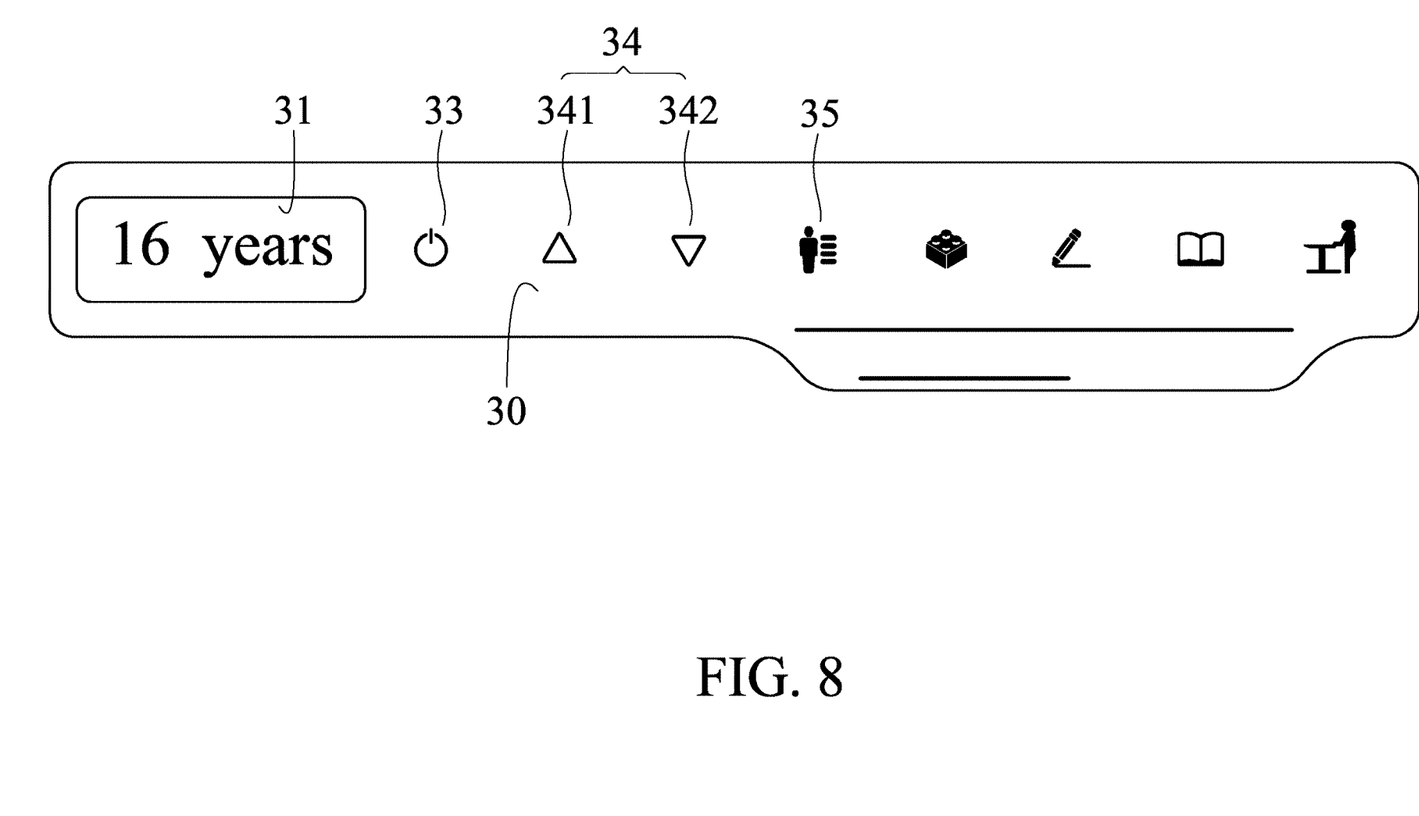
FIG. 8 is a front view of the control panel in another position than shown in FIG. 7.

Referring to FIGS. 2 and 8, the setting module 50 actuates an age-setting program 54 to receive an age entered by the user pressing the upward icon 341, the downward icon 342 and the power icon 33. The entering or select of the age includes but not limited to that the name-setting program 51 shows age-representing numbers such as 03, 04, 05 . . . 99 on the display 31, and the user presses the upward icon 341 and/or the downward icon 342 to switch between the age-representing numbers, presses the power icon 33 after selecting an intended age-representing number.

Referring to FIG. 2, on receiving the user's data, which includes the name, height, sex and age, the setting module 50 actuates a database-setting program 57 to build a user database 60 for the user and store the user database 60. Thus, a user database 60 is built for each user.

The setting module 50 executes a table-data program 58 to allow a manufacturer to enter data about the specification of the table 10. The specification includes but not limited to the model number of the table 10, the length of the telescopic struts, the thickness of the board 12 and a maximum stroke of the elevation of the board 12.

The setting module 50 executes an ergonomic-data program 59 to allow the manufacturer to enter a human-figure database. The human-figure database includes at least average heights of male and female users who are 1 to 20 years old while standing and sitting. The data about the figure of a user who sits includes a sitting height measured from a floor to the user's head top, a popliteal height measured from the floor to the back of the user's knee, and an elbow height measured from the floor to the user's elbow.

Referring to FIG. 2, the calculating module 70 executes an elevation-calculating program 71 to select an average standing height, an average sitting height, an average popliteal height and an average elbow height based on the data of the user's sex and age. Then, the calculating module 70 executes the elevation-calculating program 71 to calculate average elevations of the board 12 of the table 10 respectively for playing games, reading and writing based on the length of the telescopic struts, the thickness of the board 12 and the maximum stroke provided via the table-data program 58. The average elevations are shown on the display 31 and stored in the user database 60.

The upward icon 341 or the downward icon 342 can be pressed to instruct the calculating module 70 to increase or reduce the average elevations. Thus, optimal elevations of the board 12 are set. The optimal elevations of the board 12 are shown on the display 31 and stored in the user database 60.

After the table database, the human-figure database and the user database 60 are completed, the automatic elevation-adjusting system allows the user to operate the control panel 30 in the following manner.

The upward icon 341 or the downward icon 342 is pressed to change the user's name shown on the display 31. The power icon 33 is pressed to confirm a selected name. Then, the central control module 20 accesses to the user database 60 corresponding to the selected name. When the game icon 361 is pressed, the central control module 20 uses the average elevation for playing games stored in the user database 60 to actuate the elevating unit 11 of the table 10 to move the board 12 of the table 10 to the average elevation for playing games. When the writing icon 362 is pressed, the central control module 20 uses the average elevation for writing to actuate the elevating unit 11 to move the board 12 to the average elevation for writing. When the reading icon 363 is pressed, the central control module 20 uses the average elevation for reading to actuate the elevating unit 11 to move the board 12 to the average elevation for reading. When the standing icon 364 is pressed, the central control module 20 uses the average elevation for standing to actuate the elevating unit 11 to move the board 12 to the average elevation for standing. The average elevation for playing games, the average elevation for writing, the average elevation for reading and average elevation for standing are shown on the display 31.

However, if optimal elevations have been be entered by the user, the central control module 20 will use the optimal elevations to move the board 12 of the table 10.

Figure 9:
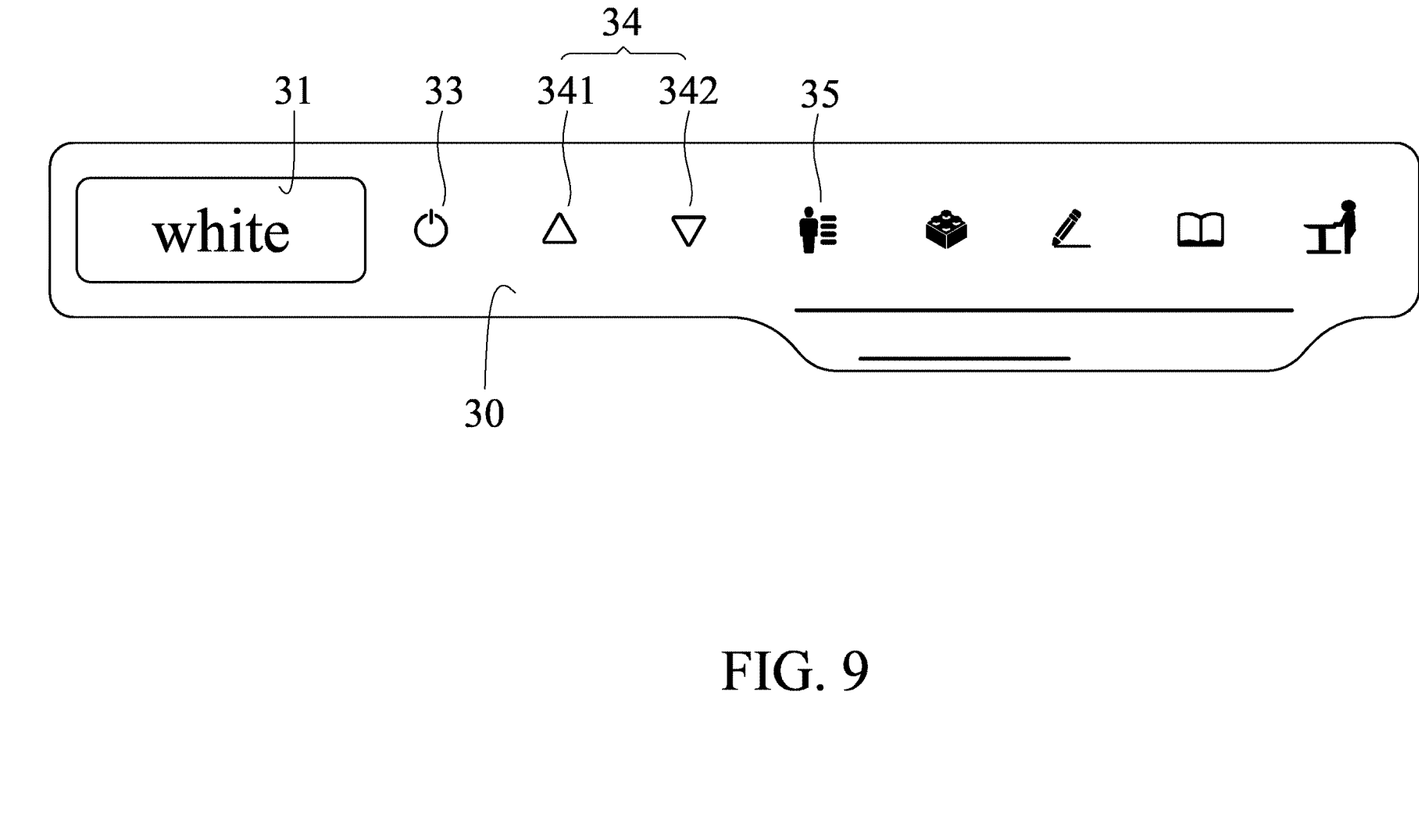
FIG. 9 is a front view of the control panel in another position than shown in FIG. 8.

Referring to FIGS. 2 and 9, in addition, the setting module 50 executes a race-setting program 55 to show "white", "beige", "African" and"brown" on the display 31. The user can press the upward icon 341, the downward icon 342 and the power icon 33 to select a race. The database-setting program 57 stores the selected race in the user database 60. The human-figure database of the ergonomic-data program 59 further includes the average standing heights, the average sitting heights, the average popliteal heights and the average elbow heights of 1 to 20-year old males and females of the races. The elevation-calculating program 71 of the calculating module 70 calculates average elevations for playing games, reading, writing and standing based on the average standing heights, the average sitting heights, the average popliteal heights and the average elbow heights of 1 to 20-year old males and females of the races.

Figure 10:
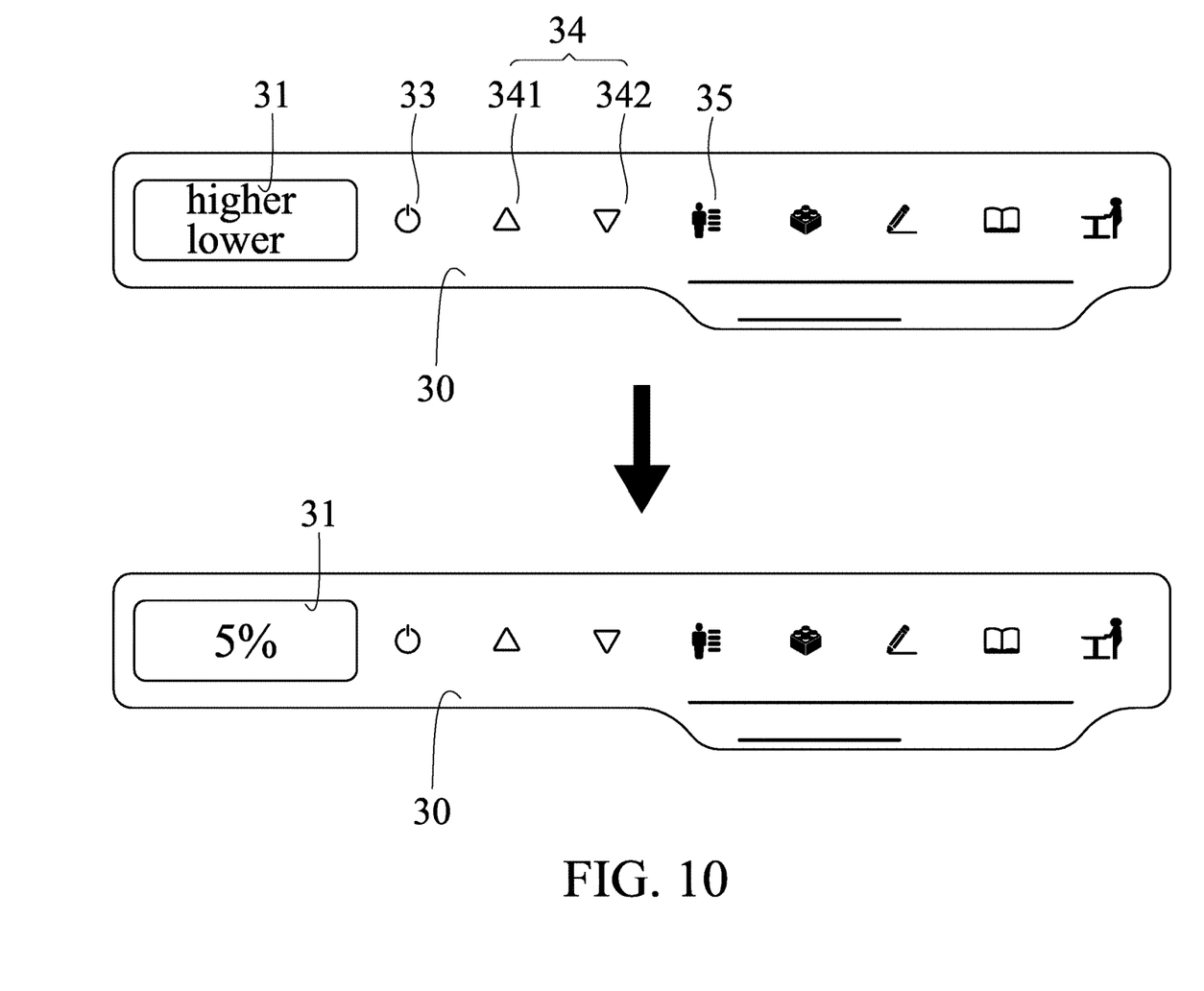
FIG. 10 is a front view of the control panel in other positions than shown in FIG. 9.

Referring to FIGS. 2 and 10, in addition, the setting module 50 executes a height excess program 56 to show "higher" and "lower" on the display 31. There are statistics of heights of children and teenagers. A rating in percentage of a height can be obtained from the statistics. For example, a rating of a height ("upper limit") of 97% means a person of this height is taller than 97% of people in a same category. A rating of another height ("lower limit") of 3% means a person of this height is taller than 3% of people at a same age. The user can press the upward icon 341, the downward icon 342 and the power icon 33 to select "higher" or "lower." Then, the height excess program 56 instructs the display 31 to show 1%-30%, one after another. The user can press the upward icon 341, the downward icon 342 and the power icon 33 to select a percentage. The height excess program 56 receives the selected percentage. For example, the user can select "higher" and 5% if the user is 5% higher than the upper limit. For example, the user can select "lower" and 5% if the user is 5% lower than the lower limit. Thus, the ergonomic-data program 59 is executed to receive the ratings of heights of people at 0 to 20 years for different sexes and races. The calculating module 70 executes the elevation-calculating program 71 to increase or reduce the average elevations based on the height excess as well as the races, the sexes and the ages. Thus, there are provided elevations that fit the user.

In addition, as the age of the user increases, the calculating module 70 automatically increases the age of a user stored in his or her user database, and calculates the average elevations based on the increased age of the user to fit the user who grows in age and figure. Based the increased age of the user, the data of the specification of the table 10 and the average heights for people who are 1 to 20 years old, the calculating module 70 calculates the average elevations for playing games, the average elevation for standing, the average elevation for reading and the average elevation for standing. The average elevation for playing games, the average elevation for standing, the average elevation for reading and the average elevation for standing are stored in the user database 60.

The elevation-calculating program 71 further calculates increments of the average elevations for playing games, standing, reading and standing as the age of the user increases, and stores the increments in the user database 60. The central control module 20 controls the automatic elevation-adjusting system to adjust the average elevations for playing games, standing, reading and standing based on the increments every year.

Advantageously, the central control module 20 actuates the elevating unit 11 to move a table to the average elevation for playing games, writing, reading or standing when the game, writing, reading or standing icon of the mode icon unit is pressed.

Moreover, the automatic elevation-adjusting system allows the user to adjust the board 12 to the optical elevation for playing games, writing, reading or standing by increasing or reducing the average elevation.

Furthermore, the automatic elevation-adjusting system provides each user with a user database to store his or her name, sex, age, race, and height excess. Thus, the automatic elevation-adjusting system automatically moves the board 12 to the average elevation for playing games, writing, reading or standing when each user enters his or her name.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. An automatic elevation-adjusting system comprising:
an elevating unit for moving a board of a table;
a control panel attached to the board and comprising:
   a display;
   an icon region comprising:
      a power icon;
      a direction icon unit comprising an upward icon and a downward icon;
      a setting icon; and
      a mode icon unit comprising a game icon, a writing icon, a reading icon and a standing icon;
a setting module operable to actuate a name-setting program, a height-setting program, a sex-setting program and an age-setting program to allow a user to press the direction icon unit and the power icon to enter data that includes a name, height, sex and age, and then build a user database to store the data as the setting icon is pressed;
a calculating module operable to actuate an elevation-calculating program to calculate an average elevation for playing games, an average elevation for writing, an average elevation for reading and an average elevation for standing based on the user's sex and age, a pre-set specification of the table and an average height corresponding to the user's sex and age, and then store the average elevations in the user database; and
a central control module operable to control the elevating unit, the control panel, the setting module, the user database and the calculating module, wherein the central control module actuates the elevating unit to move the board to the average elevation for playing games when the game icon is pressed, wherein the central control module actuates the elevating unit to move the board to the average elevation for writing when the writing icon is pressed, wherein the central control module actuates the elevating unit to move the board to the average elevation for reading when the reading icon is pressed, wherein the central control module actuates the elevating unit to move the board to the average elevation for standing when the standing icon is pressed.

2. The automatic elevation-adjusting system according to claim 1, wherein the setting module further comprises a race-setting program operable to allow the user to press the direction icon unit and the power icon to enter the user's race into the user database, wherein the calculating module calculates the average elevations based on the user's race as well as the user's sex and age.

3. The automatic elevation-adjusting system according to claim 2, wherein the setting module further comprises a height excess program operable to allow the user to press and the direction icon unit and the power icon to enter a height excess in the user database, wherein the calculating module calculates the average elevations based on the user's height excess as well as the user's sex, age and race.

4. The automatic elevation-adjusting system according to claim 3, wherein the calculating module provides optimal elevations by increasing or reducing the average elevations based on mounts of times for which the upward icon or the downward icon is pressed.

5. The automatic elevation-adjusting system according to claim 3, further comprising a power-controlling module electrically connected to the central control module and the elevating unit, and operable to receive an ON or OFF signal to turn the automatic elevation-adjusting system on or off, wherein the central control module shows the power icon to indicate that the automatic elevation-adjusting system is in a stand-by mode when the automatic elevation-adjusting system is on, wherein the central control module actuates the automatic elevation-adjusting system and shows all of the icons of the icon region on the control panel when the power icon is pressed.

6. An automatic elevation-adjusting system according to claim 1, wherein
wherein the elevation-calculating program further calculates increments of the average elevations every year, and
wherein the central control module is further operable to actuate the elevating unit to move the board according to the average elevations plus the increments.

* * * * *